United States Patent [19]

Robertson et al.

[11] Patent Number: 5,287,214
[45] Date of Patent: Feb. 15, 1994

[54] FABRY-PEROT OPTICAL FILTERS

[75] Inventors: Alexander J. Robertson, Dunmow; Stephen Day, Harlow, both of United Kingdom

[73] Assignee: Northern Telecom Limited, Montreal, Canada

[21] Appl. No.: 865,306

[22] Filed: Apr. 8, 1992

[30] Foreign Application Priority Data

Apr. 12, 1991 [GB] United Kingdom ............... 9107819

[51] Int. Cl.$^5$ .................... G02B 27/28; G01B 9/02
[52] U.S. Cl. .................... 359/260; 356/352; 359/499; 359/578; 385/11
[58] Field of Search ............... 359/260, 497, 498, 578, 359/579, 499; 385/73, 11; 356/351, 352

[56] References Cited

U.S. PATENT DOCUMENTS

| | | | |
|---|---|---|---|
| 3,471,802 | 10/1969 | Caulfield | 359/498 |
| 3,681,608 | 8/1972 | Derderian et al. | 359/578 |
| 3,740,144 | 6/1973 | Walker | 359/578 |
| 3,802,775 | 4/1974 | Hughes | 356/352 |
| 3,934,210 | 1/1976 | Yarborough et al. | 359/498 |
| 3,936,147 | 2/1976 | Murakami . | |
| 4,196,396 | 4/1980 | Smith | 359/578 |
| 4,199,226 | 4/1980 | Weber et al. | 359/260 |
| 4,502,762 | 3/1985 | Anderson | 359/498 |
| 4,508,964 | 4/1985 | Gunning, III et al. | 356/352 |
| 4,548,506 | 10/1985 | Elson | 356/352 |
| 4,678,287 | 7/1987 | Buhrer . | |
| 4,772,104 | 9/1988 | Buhrer . | |
| 4,813,756 | 3/1989 | Frenkel et al. | 385/73 |
| 4,969,744 | 11/1990 | Ordell | 356/352 |
| 4,973,120 | 11/1990 | Jopson et al. | 385/11 |

FOREIGN PATENT DOCUMENTS

2223324 4/1990 United Kingdom .

Primary Examiner—Martin Lerner
Attorney, Agent, or Firm—Lee, Mann, Smith, McWilliams, Sweeney & Ohlson

[57] ABSTRACT

Simple polarization independent wavelength tuning components (filters) employ a filter element, such as a Fabry-Perot etalon element, which is such that light input thereto undergoes two element transitions with orthogonal polarization states before being output, in order to suppress polarization noise. The element may be mounted for rotation about a single axis. In one arrangement, two etalon filters (20, 21), are separated by a half wave plate (22) providing the necessary polarization rotation. The two etalon filters and the half wave plate comprise a single element rotatable about the single axis.

4 Claims, 8 Drawing Sheets

PRIOR ART

FABRY-PEROT OPTICAL FILTERS

BACKGROUND OF THE INVENTION

This invention relates to Fabry-Perot optical filters and in particular to the suppression of polarisation noise and crosstalk in Fabry-Perot wavelength tuning components.

To enhance the data carrying capacity of single mode optical fibre systems, wavelength multiplexing/demultiplexing techniques can be used. A specified wavelength can be separated from a multitude of channels at different wavelengths using wavelength selective components. One of a number of techniques is to position an interference filter (Fabry-Perot etalon) in front of each receiver. Each filter would pass only one wavelength out of all the wavelengths present in the system.

To obtain a large number of channels, the pass band of the filters would have to be very narrow. Typical channel spacings are 4 nm, implying that the filter is required to have a full width at half maximum of less than 1 nm. As indicated above, one method of producing suitable filters is to use Fabry-Perot etalons. The transmission wavelength of a Fabry-Perot etalon can be lowered by rotating the etalon (filter) away from normal incidence. This allows one filter to cover a range of wavelengths. The filter can either be pre-adjusted and set to a particular wavelength or can be used to actively "tune in" to any of the wavelengths available.

Figure 1A:
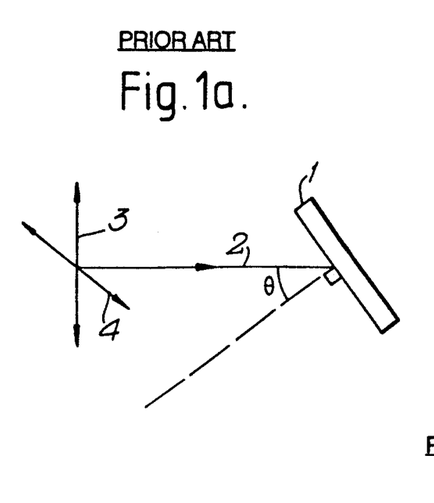
FIG. 1a illustrates schematically two orthogonal polarised beams incident on a filter at angle $\theta$ to the beams.
Figure 1B:
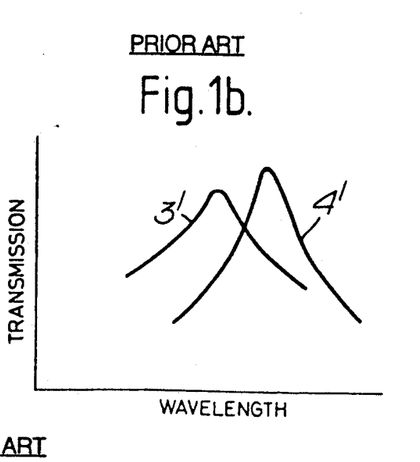
Figure 2:
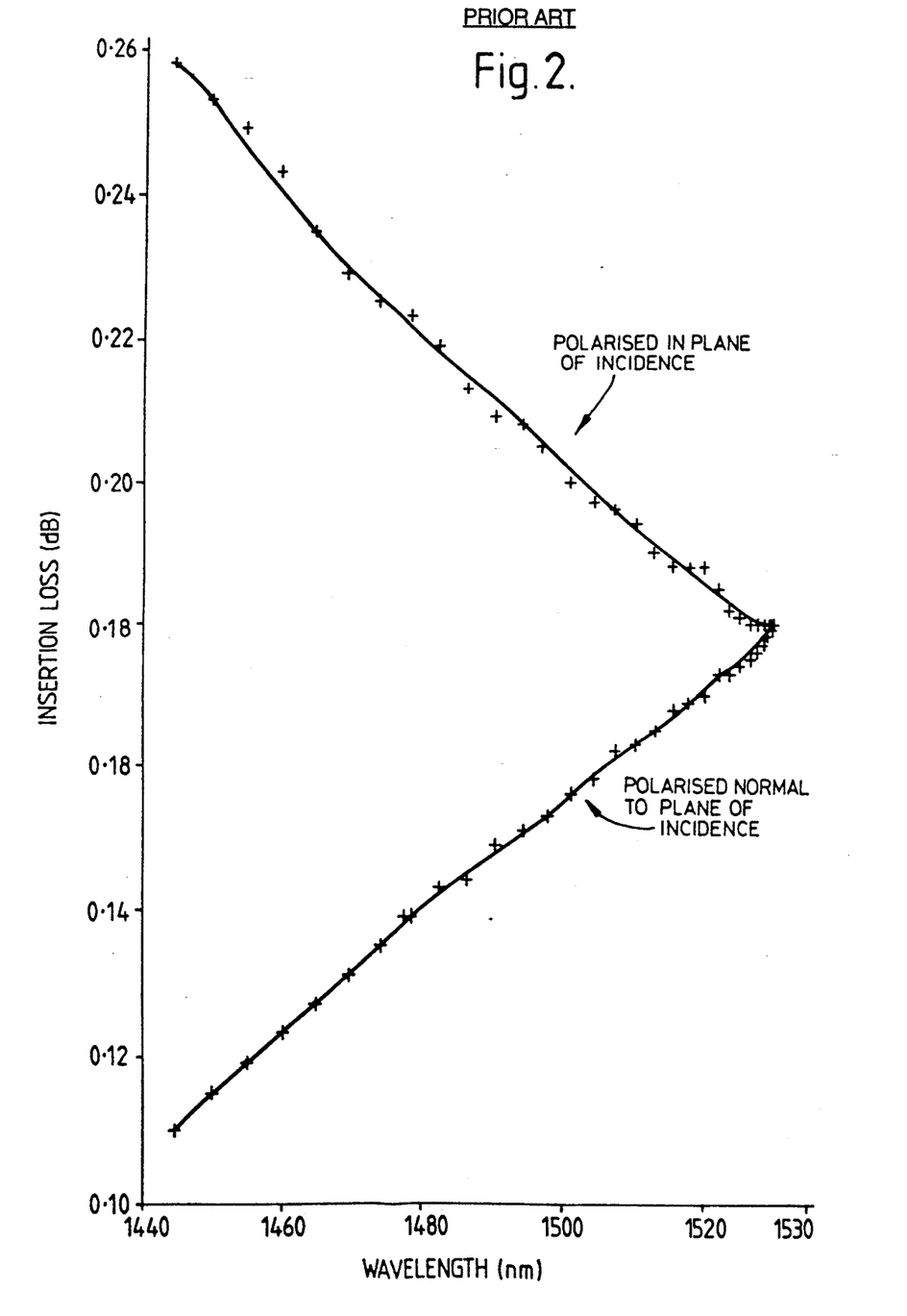
FIG. 2 illustrates the response of the filter to the two orthogonal polarisations as the filter is rotated away from normal incidence for the range 0° to 30°, the absorption coefficient being zero.
Figure 3:
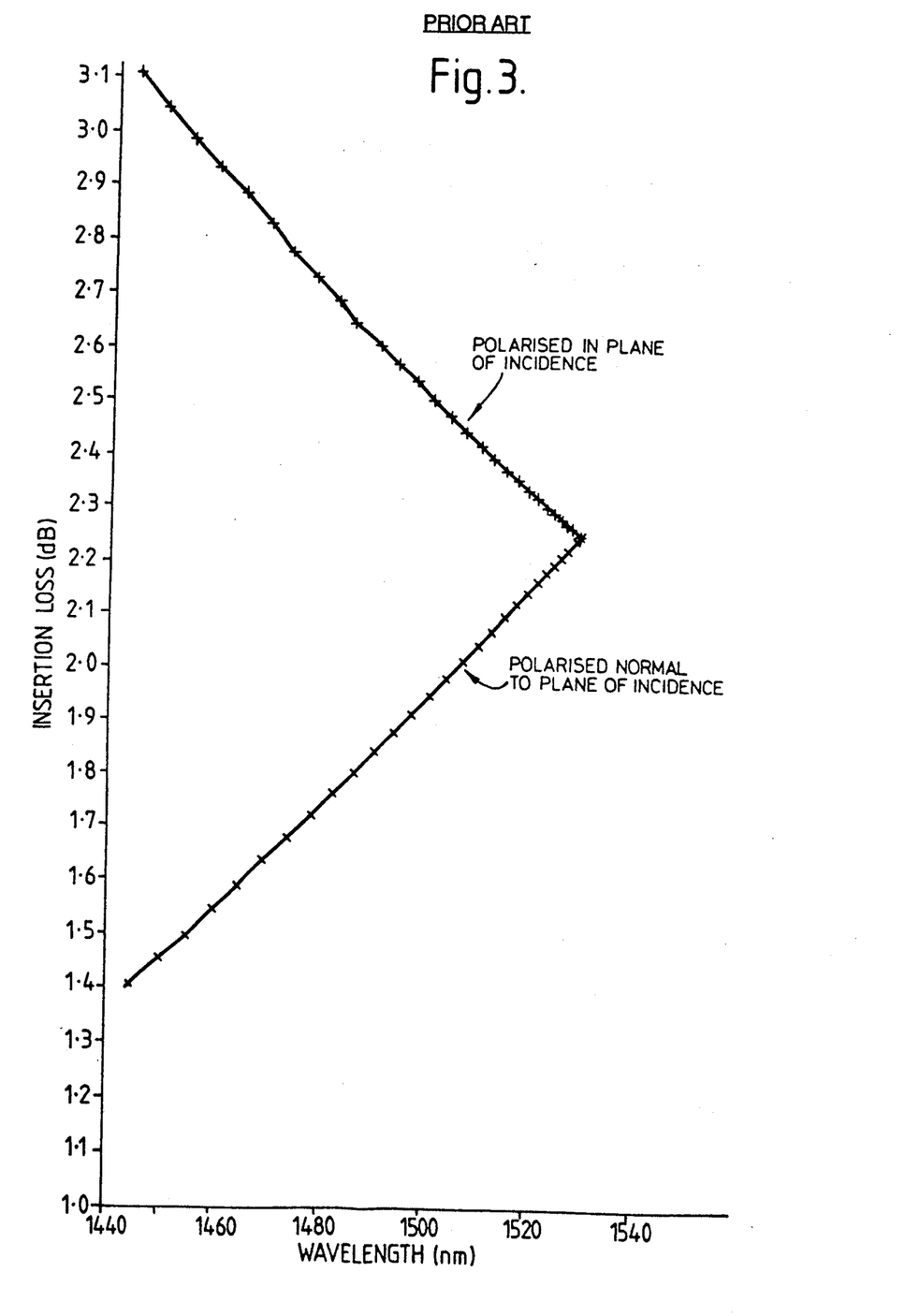
FIG. 3 is similar to FIG. 2 but illustrates the response for an absorption coefficient of 15/cm.

However, as a filter is rotated, the response of the filter varies, depending upon the state of polarisation of the incoming light. The two extremes of behaviour for a given angle of incidence $\theta$ of a light beam 2 to a filter 1 are for light polarised in the plane of incidence 3 and for light polarised normal to the plane of incidence 4 (FIG. 1a). The corresponding responses $3^1$ and $4^1$ of the filter are illustrated in FIG. 1B. The response of the filter to the two orthogonal polarisations will depend upon the absorption of the material used to make the filter. FIG. 2 shows the variation in insertion loss with peak transmission wavelength as the filter is rotated from 0° to 30° for a filter with no absorption ($\alpha=0$/cm), whilst FIG. 3 shows the same curve for an absorption $\alpha$ of 15/cm. The results illustrated were obtained for a Fabry-Perot cavity of seven half wavelengths, each mirror being comprised of eleven layers.

The change in insertion loss as the filter is rotated is greater when absorption is present. As well as the insertion loss being different for the orthogonal polarisation, the peak transmission wavelengths differ. This has the effect of increasing the difference in transmission for the two orthogonal polarisations.

Figure 4:
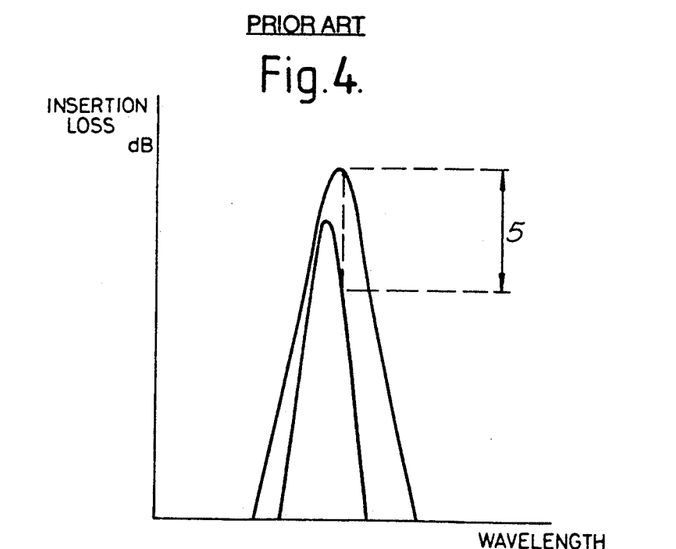
FIG. 4 illustrates an example of polarisation noise.
Figure 5:
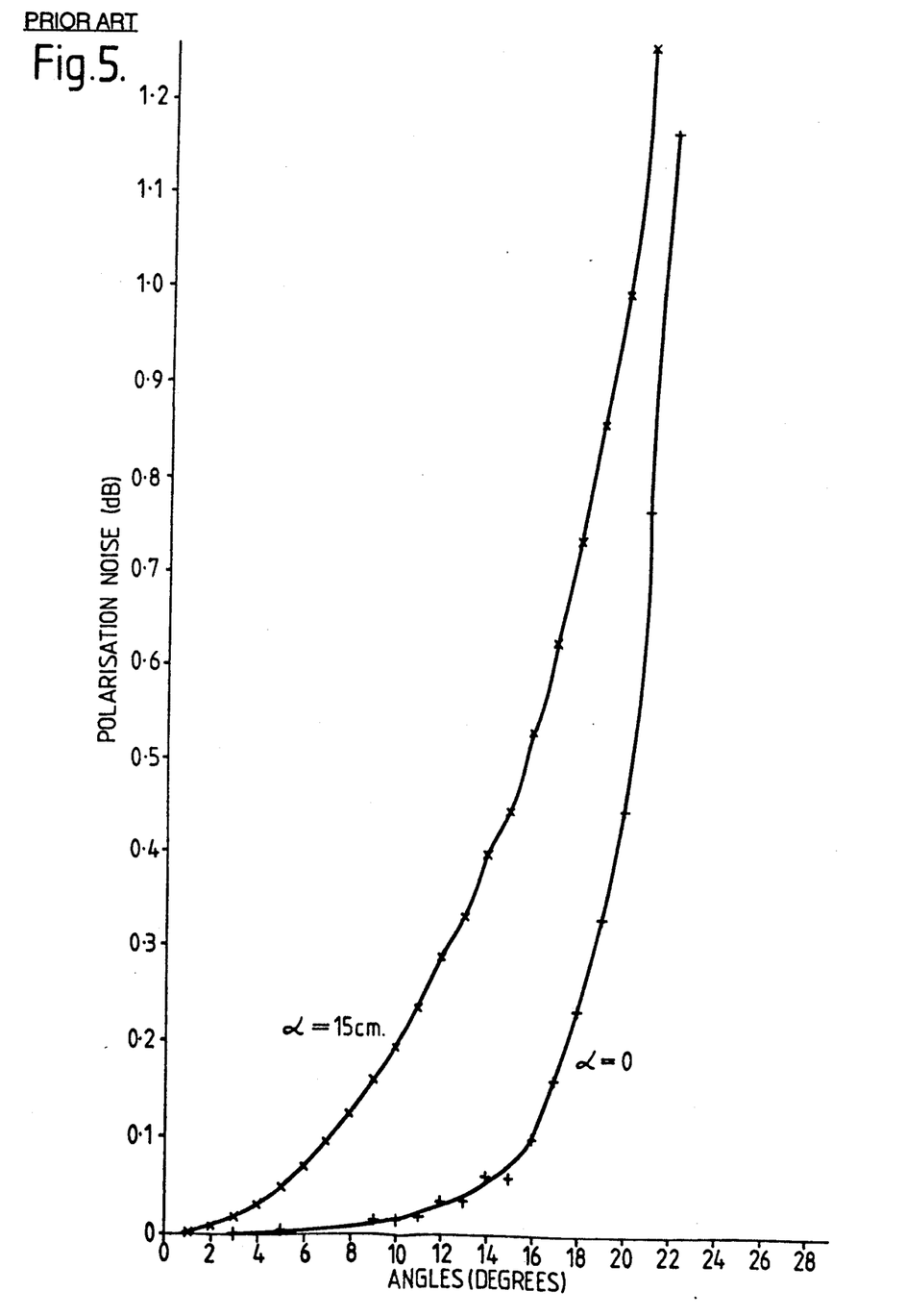
FIG. 5 shows the variation of polarisation noise with angle of rotation of the filter.

The difference in transmission at a particular wavelength is the polarisation noise. An example of this is illustrated in FIG. 4, where the difference in peak heights is less than the polarisation noise 5. FIG. 5 shows a graph of polarisation noise plotted against filter rotation angle for an absorption of 0/cm and 15/cm. A typical figure for the level of polarisation noise that can be tolerated by a system is 0.1 dB.

Another important factor when designing multiwavelength systems is the interchannel isolation or crosstalk. In order to obtain sufficient isolation between channels, it is necessary to have two filters in series. These factors imply that the level of polarisation noise that can be tolerated by each filter is 0.05 dB. As is apparent from FIG. 5, this restricts the tuning range of a non-absorbing filter to 14°, or 20 nm, whilst an absorbing filter is restricted to 5°, or 3 nm.

Figure 6:
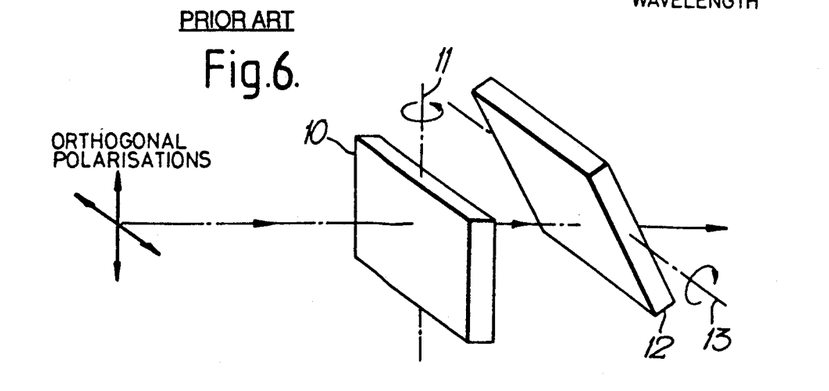
FIG. 6 shows the prior art arrangement of two filters (elements) arranged in series in order to suppress polarisation noise.
Figure 7:
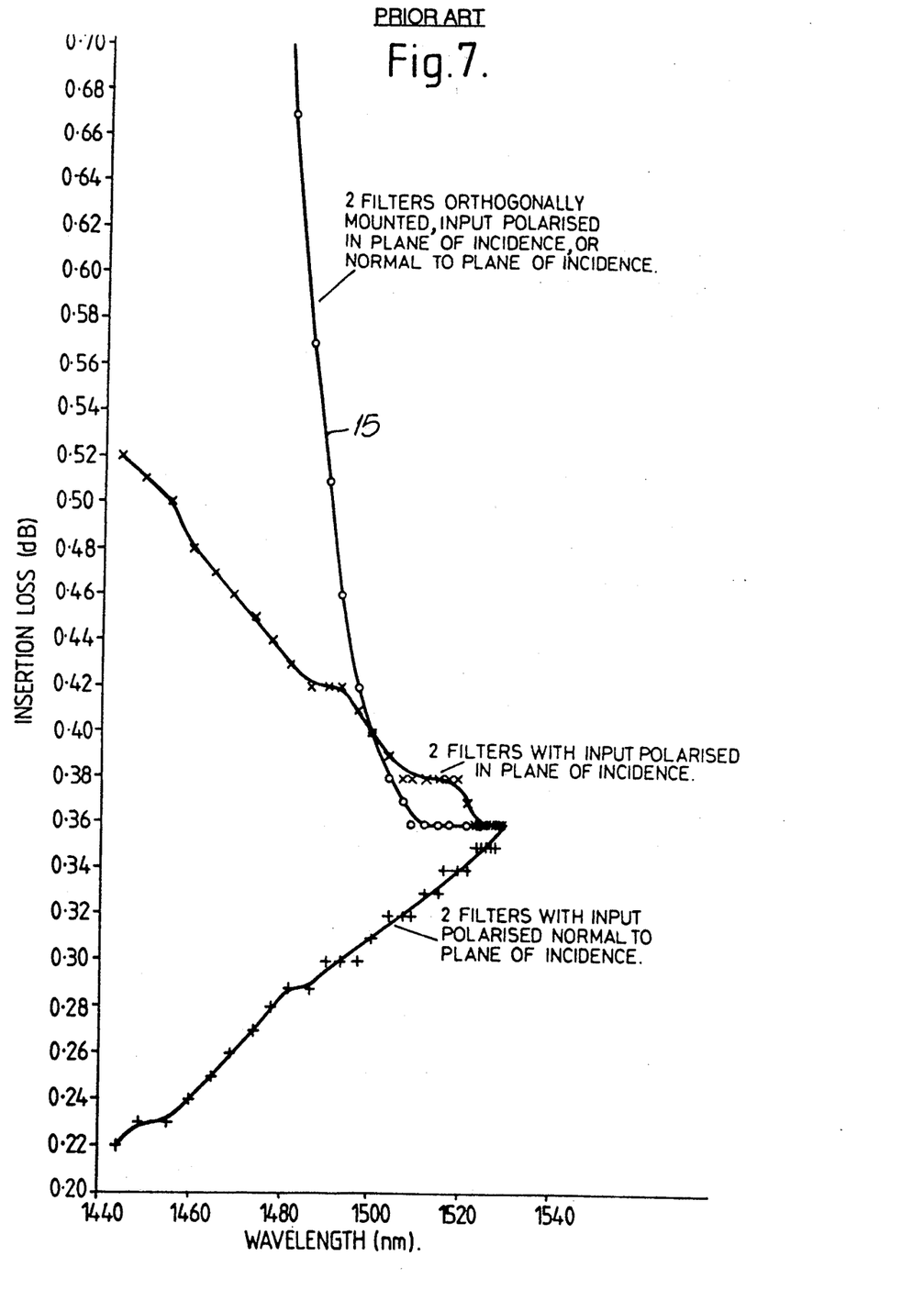
FIG. 7 illustrates insertion loss of a two-element filter versus wavelength, as the filter is rotated, for two cases and an absorption coefficient of zero.
Figure 8:
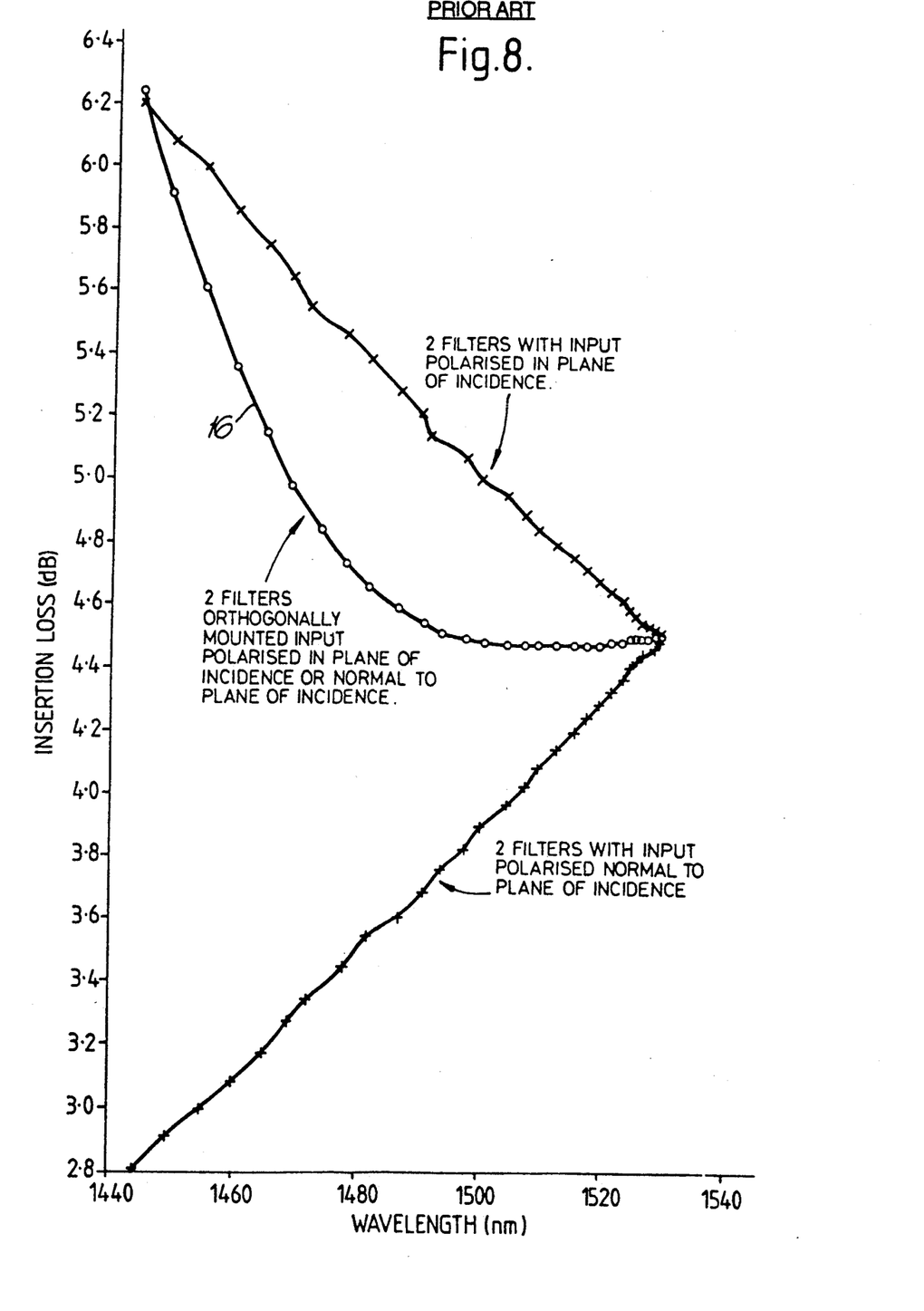
FIG. 8 is similar to FIG. 7 but relates to an absorption coefficient of 15/cm.

In our GB Patent Application GB 2 223 324 A, the two filters are set up so that they can be tuned by rotating them about orthogonal axes. The response is then independent of the polarisation. FIG. 6 shows this arrangement schematically. One filter 10 rotates about axis 11, whereas another filter 12 rotates about axis 13. FIG. 7 shows the response of such a filter with zero absorption. This filter can be tuned over 20 nm before polarisation noise limits the performance. With two orthogonal filters in series (curve 15), the insertion loss is constant over the first 20 nm and then starts to rise, i.e. polarisation noise is eliminated at the expense of insertion loss. The insertion loss is still only 0.7 dB when the filter has been tuned 50 nm away from the nominal wavelength. Therefore, the use of orthogonal filters has more than doubled the usable range of the filter. FIG. 8 shows the response (curve 16) of a similar filter which has an absorption of 15/cm. The tuning range of this basic two element filter was limited to 3 nm as indicated above, however, it is now possible to use this filter over 50 nm before the insertion loss begins to rise steeply. Thus in this case the use of orthogonal filters has increased the tuning range by almost a factor of 20.

An object of the present invention is to provide improved filter arrangements and in particular arrangements where it is not necessary separately to rotate two orthogonally mounted interference filters as was proposed in our prior GB patent application.

SUMMARY OF THE INVENTION

According to one aspect of the present invention there is provided an optical filter including a filter element which is such that light input to the optical filter undergoes two element transitions with orthogonal polarisation states before being output from the optical filter whereby to suppress polarisation noise.

According to another aspect of the present invention there is provided an optical transmission system employing multiwavelength transmission and including a plurality of receivers/transmitters each associated with a respective predetermined wavelength, and wherein associated with each receiver is a respective optical filter passing the respective wavelength, the optical filter including a filter element which is such that light input to the optical filter undergoes two element transitions with orthogonal polarisation states before being output from the optical filter whereby to suppress polarisation noise.

According to a further aspect of the present invention there is provided an optical receiver including an optical filter passing a predetermined wavelength, the optical filter including a filter element which is such that light input to the optical filter undergoes two element transitions with orthogonal polarisation states before being output from the optical filter whereby to suppress polarisation noise.

BRIEF DESCRIPTION OF THE DRAWINGS

Embodiments of the invention will now be described with reference to the accompanying drawings, in which:

FIG. 1b illustrates transmission versus wavelength (filter response) extremes of behaviour for the filter at angle θ for the orthogonal polarised beams of FIG. 1a;

DESCRIPTION OF THE PREFERRED EMBODIMENTS

The prior art arrangement illustrated in FIG. 6 involves the complication that the two orthogonally mounted interference filters 10 and 12 have to be rotated separately albeit the amount of movement is the same for both, i.e. they will both be set to the same angle for a particular wavelength but it is measured relative to different (orthogonal planes). The need to rotate the filters separately is overcome by the arrangements proposed below whilst still achieving polarisation insensitivity.

Figure 9:
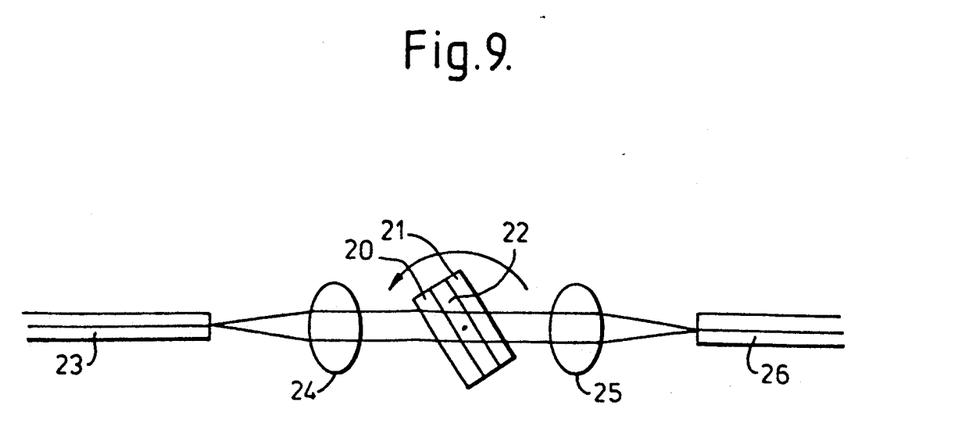
FIG. 9 illustrates a first embodiment of polarisation insensitive filter component according to the present invention.

The arrangement of FIG. 9 employs two interference (etalon) filters 20 and 21 separated by a half wave plate retarder 22. The elements 20, 21 and 22 are combined to form a single polarisation insensitive filter component which is rotatable as indicated. The half wave plate retarder 22 changes the polarisation of linearly polarised light and changed the handedness of circularly polarised light. It converts vertically linearly polarised light to horizontally polarised light and vice versa. Thus the polarisation of the light output from single mode input fibre 23, collimated by optics 24 and incident on the first filter 20 is rotated by half wave plate retarder 22 so that it meets the second filter 21 in an orthogonal state, the light output from filter 21 being focussed by collimating optics 25 onto a single mode or multimode output fibre 26.

Figure 10:
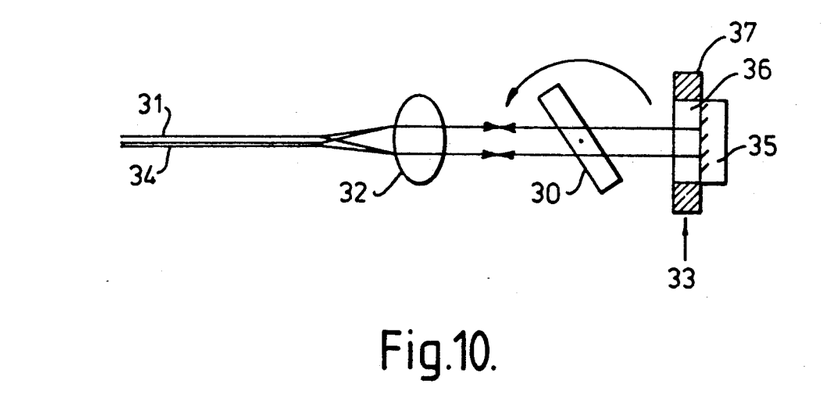
FIG. 10 illustrates a second embodiment of polarisation insensitive filter component according to the present invention.

The arrangement of FIG. 10 uses a single filter (etalon) 30 and the light is passed through it twice. The light is input by single mode input fibre 31 which is only shown schematically and collimated by optics 32 for incidence on filter 30. The light passes through filter 30, is rotated into an orthogonal state by the faraday rotator/mirror combination 33 and passes back through filter 30, being focussed onto a single mode or multimode output fibre 34 by optics 32. The combination 33 comprises a dielectric or metal mirror 35 and a 45° single pass faraday rotator 36 with a magnet 37. As with the FIG. 9 arrangement, there is only one required axis of rotation for the etalon filter although the two etalon transitions necessary for polarisation insensitivity are provided.

In the FIG. 9 arrangement the two etalon transitions are provided by different etalons whilst in the FIG. 10 arrangement the two etalon transitions are achieved by two passes through one etalon, the two passes having orthogonal polarisations.

Figure 11:
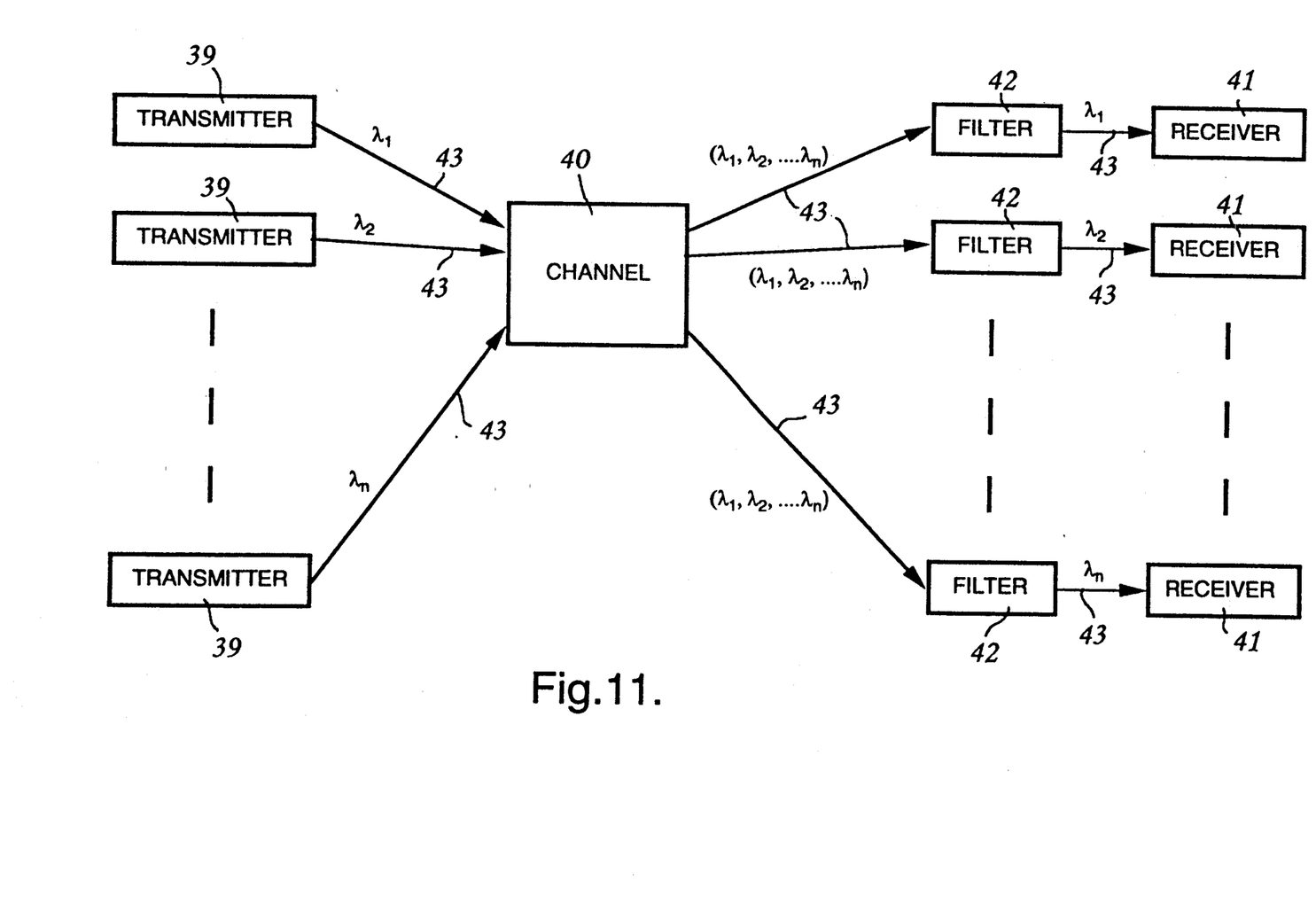
FIG. 11 illustrates a multiwavelength transmission system in which filter components of the present invention can be employed.

Both arrangements provide wavelength tuning components that have reduced polarisation sensitivity and give a narrow pass band with low interchannel crosstalk as referred to in our aforementioned patent application but with the advantage of the single axis of rotation i.e. simpler components. The single axis of rotation offers considerable advantages over the previously proposed arrangement and lends itself to production of a simplified fixed manual preset device or a continuously tuneable component which could be manually or electrically driven for multiwavelength system applications. A fixed preset filter could be made using a filter rotation mechanism that is removed once a filter is in the correct orientation and fixed in position. A multiwavelength optical transmission system as illustrated schematically in FIG. 11 may include a plurality of transmitters 39 each emitting a respective wavelength, a multiplexer and multiwavelength transmission channel 40, a plurality of receivers 41 each associated with a respective wavelength to the receiver 41. A filter component as described above is associated with each receiver in order to pass only the respective wavelength. The transmission medium of the system may be single fibre 43.

We claim:

1. An optical filter including a filter element which is such that a light beam including polarisation noise and input to the optical filter undergoes two filter element transitions with a transformation to an orthogonal polarisation state between said two transitions before being output from the optical filter, whereby to suppress the polarisation noise, wherein the filter element is a Fabry-Perot etalon element, and wherein the etalon element is mounted with provision for rotation about a single axis.

2. An optical filter including a filter element which is such that a light beam including polarisation noise and input to the optical filter undergoes two filter element transitions with a transformation to an orthogonal polarisation state between said two transitions before being output from the optical filter, whereby to suppress the the polarisation noise, and wherein the filter element is a Fabry-Perot etalon element which comprises two etalon filters in series with a half wave plate therebetween whereby to rotate the polarisation state of light output from the first etalon filter through 90° prior to input to the second etalon filter, the etalon filters and the half wave plate comprising a single element rotatable about a single axis.

3. An optical transmission system employing multiwavelength transmission over optical fibre and including a plurality of receivers and transmitters each associated with a respective predetermined wavelength, and wherein associated with each receiver is a respective optical filter passing the respective wavelength, the optical filter including a filter element which is such that a light beam including polarisation noise input to the optical filter undergoes two filter element transitions with a transformation to an orthogonal polarisation state between said two transitions before being output from the optical filter, whereby to suppress the polarisation noise, wherein the filter element is a Fabry-Perot etalon element, and wherein the etalon element is mounted with provision for rotation about a single axis.

4. An optical transmission system as claimed in claim 3 wherein the transmission medium is single mode optical fibre.

* * * * *